US008881661B2

(12) United States Patent
Tsai (10) Patent No.: US 8,881,661 B2
(45) Date of Patent: *Nov. 11, 2014

(54) FOLDABLE TABLE

(71) Applicant: Ping-Cheng Tsai, Shenzhen (CN)

(72) Inventor: Ping-Cheng Tsai, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/141,394

(22) Filed: Dec. 26, 2013

(65) Prior Publication Data

US 2014/0116302 A1 May 1, 2014

Related U.S. Application Data

(63) Continuation of application No. 13/694,182, filed on Nov. 1, 2012, now Pat. No. 8,677,912.

(51) Int. Cl.

| A47B 3/00 | (2006.01) |
|---|---|
| A47B 13/06 | (2006.01) |
| A47B 3/08 | (2006.01) |
| A47B 3/087 | (2006.01) |
| F16C 11/10 | (2006.01) |
| A47B 13/08 | (2006.01) |

(52) U.S. Cl.
CPC .................. *F16C 11/10* (2013.01); *A47B 13/06* (2013.01); *A47B 3/0818* (2013.01); *A47B 13/083* (2013.01); *A47B 3/087* (2013.01); *A47B 2003/008* (2013.01)
USPC ........................................................ 108/132

(58) Field of Classification Search
CPC ................... A47B 2003/08; A47B 2003/0821; A47B 3/08; A47B 3/0911; A47B 3/0912; A47B 3/091; A47B 3/0918; A47B 3/0917
USPC ......... 108/129, 132, 171, 172, 173, 174, 115, 108/35, 36, 167, 168, 169; 248/188.6, 439
See application file for complete search history.

(56) References Cited

U.S. PATENT DOCUMENTS

| 6,058,853 | A * | 5/2000 | Pinch | 108/129 |
|---|---|---|---|---|
| 7,278,361 | B2 * | 10/2007 | Zhurong et al. | 108/168 |
| 7,475,641 | B2 * | 1/2009 | Jin | 108/132 |
| 7,634,969 | B2 * | 12/2009 | Neunzert et al. | 108/132 |
| 7,640,870 | B2 * | 1/2010 | Strong et al. | 108/132 |
| 8,225,725 | B2 * | 7/2012 | Voris | 108/132 |
| 8,261,676 | B2 * | 9/2012 | VanNimwegen et al. | 108/125 |
| 2002/0092445 | A1 * | 7/2002 | Glover et al. | 108/129 |
| 2005/0061214 | A1 * | 3/2005 | Tsai | 108/132 |
| 2005/0155534 | A1 * | 7/2005 | Lin et al. | 108/132 |
| 2008/0216719 | A1 * | 9/2008 | Larcom et al. | 108/132 |
| 2011/0017109 | A1 * | 1/2011 | Stanford | 108/132 |

* cited by examiner

*Primary Examiner* — Jose V Chen
(74) *Attorney, Agent, or Firm* — Raymond Y. Chan; David and Raymond Patent Firm (57) ABSTRACT

A foldable table includes a first tabletop panel, a second tabletop panel, and a reinforcing frame which includes first through fourth reinforcing members mounted along longitudinal sides of the first and second tabletop panels respectively, a first transverse member transversely extended between outer end portions of the first and second reinforcing members at the first tabletop panel, and a second transverse member transversely extended between outer end portions of the third and fourth reinforcing members at the second tabletop panel. Two ends of the first transverse member are affixed to the first and second reinforcing members in a non-rotatably movable manner. Two ends of the second transverse member are affixed to the third and fourth reinforcing members in a non-rotatably movable manner. Therefore, the first and second transverse members enhance the rigidity of the reinforcement frame to support two transverse sides of the first and second tabletop panels respectively.

20 Claims, 7 Drawing Sheets

FOLDABLE TABLE

CROSS REFERENCE OF RELATED APPLICATION

This is a Continuation application that claims the benefit of priority under 35 U.S.C. §119 to a non-provisional application, application Ser. No. 13/694,182, filed Ser. No. 10/01/2012, now U.S. Pat. No. 8,677,912.

BACKGROUND OF THE PRESENT INVENTION

1. Field of Invention

The present invention relates to a table, and more particularly to a foldable table which is equipped with a reinforcing frame for substantially strengthening a structural integrity of the foldable table, and a hinge arrangement for selectively and conveniently folding and unfolding a tabletop of the foldable table.

2. Description of Related Arts

A conventional foldable table usually comprises a tabletop and a supporting frame which comprises a tabletop reinforcing frame and a foldable leg frame connected thereunder in a pivotally foldable manner. When the foldable table is in use, the leg frame is pivotally unfolded and extended to support the tabletop at an elevated height, and when the foldable table is not in use, the leg frame is capable of being folded towards the tabletop for reduction in its overall size so as to facilitate easy storage and transportation.

Conventionally, most of the improvements for conventional foldable tables have been overwhelmingly concentrated on the leg frame. Persons skill in the art have devoted themselves in developing new kinds of leg frames and the foldable mechanism in order to make the foldable table easier to fold, more compact in size and more secure in structure.

On the other hand, however, it has been recognized that the tabletop may also be designed to reduce an overall size of the foldable table (e.g. by making the tabletop foldable). Although it is conceived that by altering the structure of the tabletop, the overall stability and security of the foldable table may be substantially deteriorated, this disadvantage should be carefully tackled so as to develop an optimal foldable table which is both compact in size and secure in structure.

SUMMARY OF THE PRESENT INVENTION

The invention is advantageous in that it provides a foldable table which is equipped with a reinforcing frame for substantially strengthening a structural integrity of the foldable table, and a hinge arrangement for selectively and conveniently folding and unfolding a tabletop of the foldable table.

Another advantage of the invention is to provide a foldable table which comprises a foldable frame which is capable of supporting a tabletop in a foldably movable manner without affecting the stability of the foldable table.

Another advantage of the invention is to provide a foldable table which comprises a hinge arrangement comprising a pivot pin pivotally connecting a two connecting joints for facilitating folding motions between two tabletop panels.

Another advantage of the invention is to provide a foldable table comprising a foldable frame which does not involve complicated and expensive mechanical components and processes so that the manufacturing cost of the present invention can be minimized.

Additional advantages and features of the invention will become apparent from the description which follows, and may be realized by means of the instrumentalities and combinations particular point out in the appended claims.

According to the present invention, the foregoing and other objects and advantages are attained by providing a foldable table, comprising:

a tabletop, which comprises:
a first tabletop panel;
a second tabletop panel;
a first peripheral edge rim downwardly and peripherally extended from the first tabletop panel to define a first receiving cavity within a bottom surface of the first tabletop panel and the first peripheral edge rim; and
a second peripheral edge rim downwardly and peripherally extended from the second tabletop panel to define a second receiving cavity within a bottom surface of the second tabletop panel and the second peripheral edge rim; and
a foldable frame, which comprises:
a reinforcing frame which comprises first through fourth elongated reinforcing member spacedly mounted along two longitudinal sides of the first receiving cavity and the second receiving cavity respectively;
a first and a second leg frame pivotally mounted on the first receiving cavity and the second receiving cavity respectively; and
a hinge arrangement, which comprises:
a first connecting joint provided between inner ends of the first and third elongated reinforcing member respectively for allowing the first elongated reinforcing member and the third elongated reinforcing member to pivotally fold and unfold with respect to each other;
a second connecting joint provided between inner ends of the second and fourth elongated reinforcing member respectively for allowing the second elongated reinforcing member and the fourth elongated reinforcing member to pivotally fold and unfold with respect to each other; and
a first and a second locker device coupled to the first connecting joint and the second connecting joint respectively, wherein the first locker device and the second locker device are arranged to operate between a locked position and an unlock position, wherein in the locked position, the first locker device and the second locker device are arranged to lock up pivotal movements of the first connecting joint and the second connecting joint, wherein in the unlocked position, the first locker device and the second locker device are arranged to unlock the pivotal movements of the first connecting joint and the second connecting joint so as to allow the first tabletop panel to fold and unfold with respect to the second tabletop panel.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Referring to FIG. 1 to FIG. 7 of the drawings, a foldable table according to a preferred embodiment of the present invention is illustrated, in which the foldable table comprises a tabletop 10, and a foldable frame 20.

Figure 1:
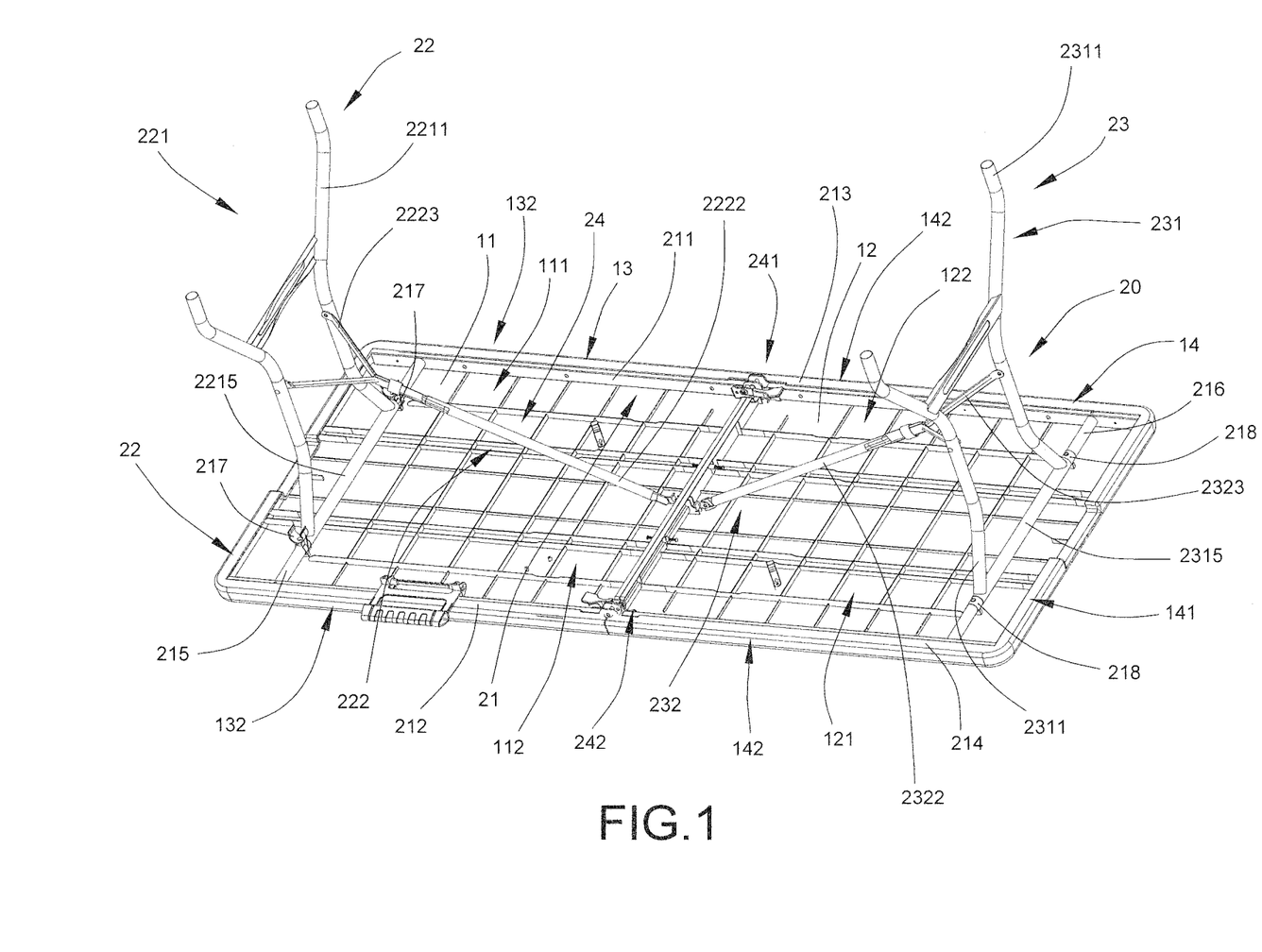
FIG. 1 is a perspective view of a foldable table according to a preferred embodiment of the present invention.
Figure 2:
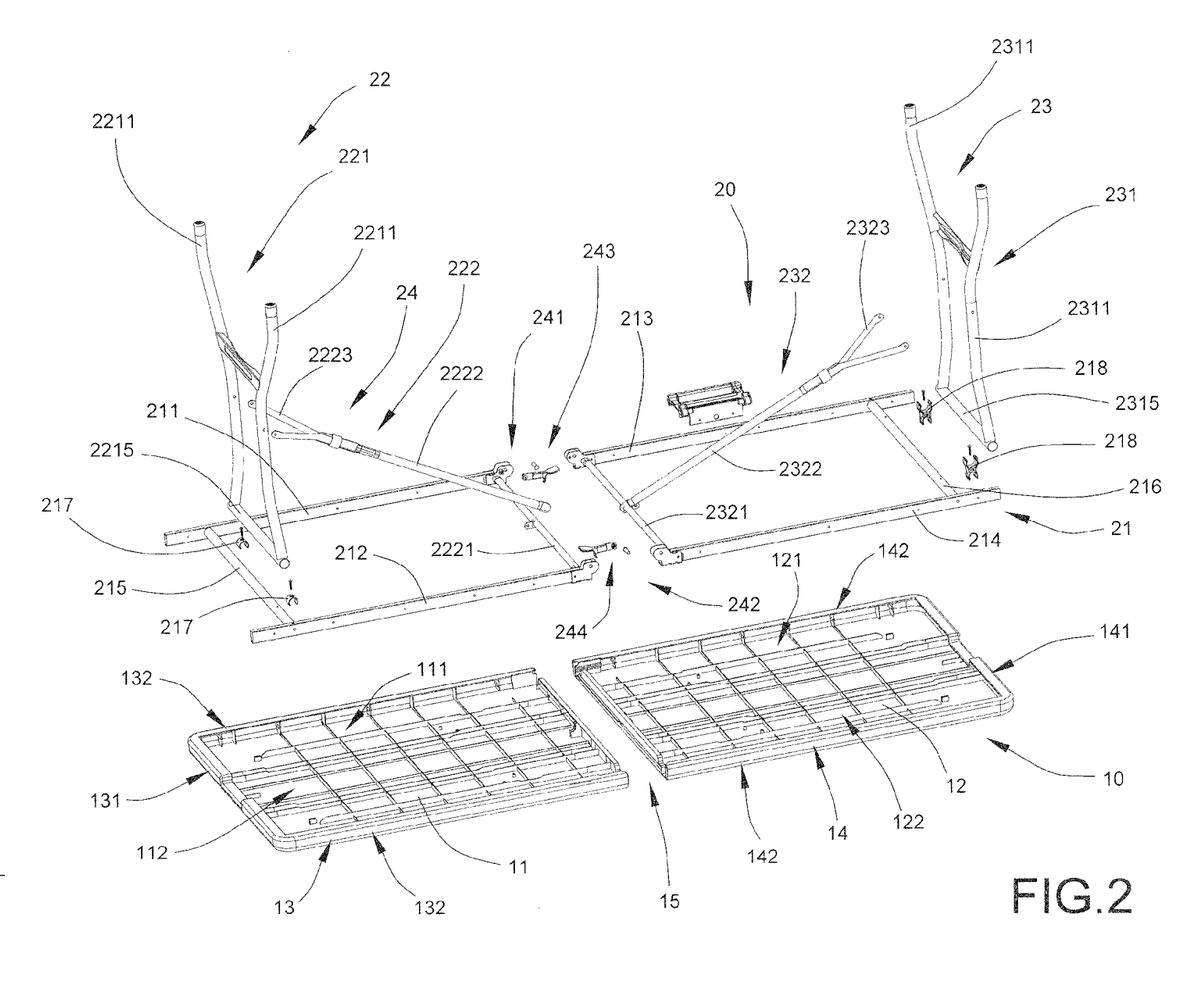
FIG. 2 is an exploded perspective view of the foldable table according to the above preferred embodiment of the present invention.
Figure 3:
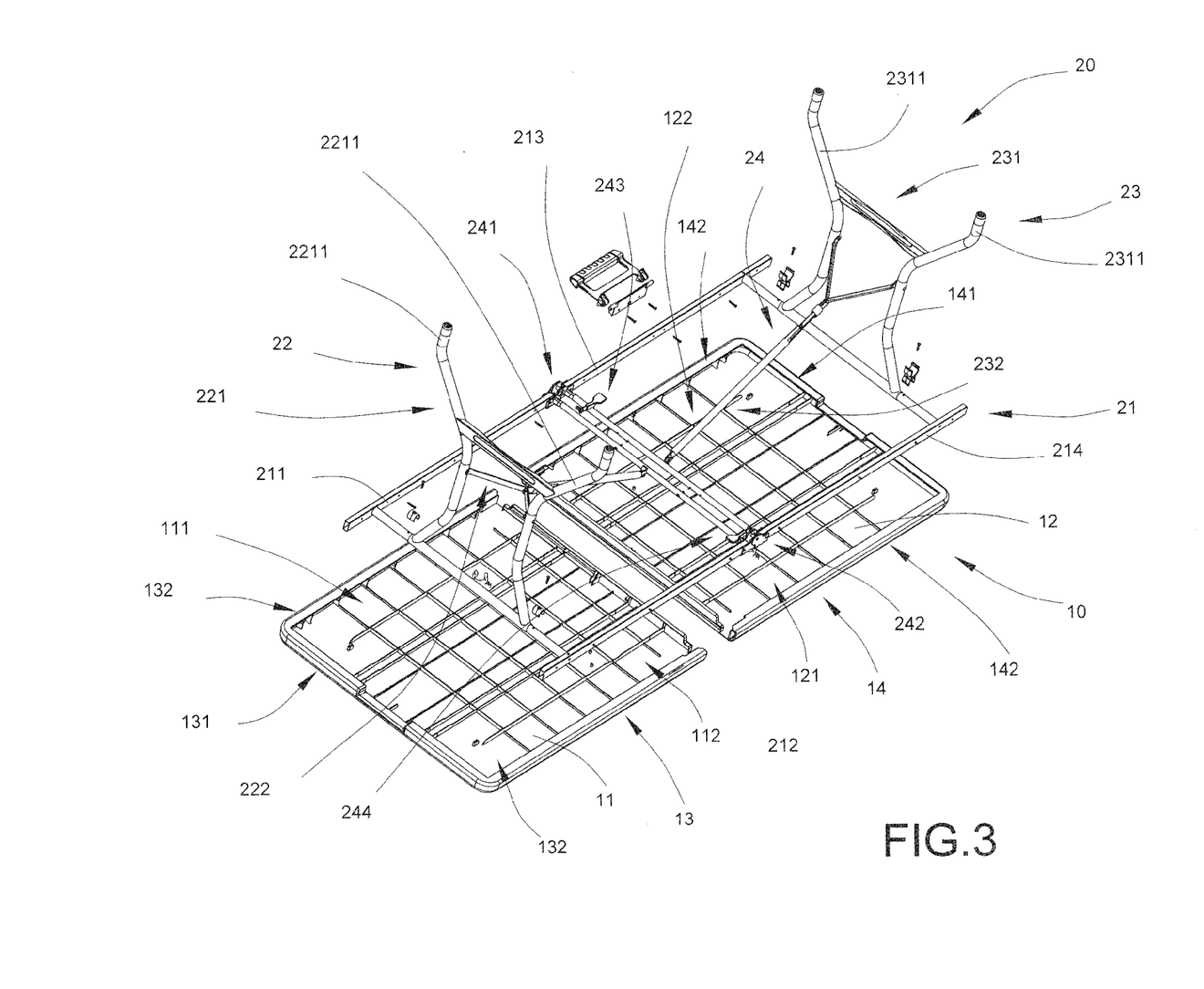
FIG. 3 is a schematic diagram of the foldable table according to the above preferred embodiment of the present invention.

The tabletop 10 comprises a first tabletop panel 11, a second tabletop panel 12, a first peripheral edge rim 13 and a second peripheral edge rim 14. On the other hand, the foldable frame 20 comprises a reinforcing frame 21, a first leg frame 22, a second leg frame 23 and a hinge arrangement 24.

The first peripheral edge rim 13 is downwardly and integrally extended from the first tabletop panel 11 to define a first receiving cavity 111 within a bottom surface 112 of the first tabletop panel 11 and the first peripheral edge rim 13.

The second peripheral edge rim 14 is downwardly and integrally extended from the second tabletop panel 12 to define a second receiving cavity 121 within a bottom surface 122 of the second tabletop panel 12 and the second peripheral edge rim 14.

The reinforcing frame 21 comprises first through fourth elongated reinforcing member 211, 212, 213, 214 spacedly mounted along two longitudinal sides of the first receiving cavity 111 and the second receiving cavity 121 respectively.

The first and the second leg frame 22, 23 are pivotally mounted on the first receiving cavity 111 and the second receiving cavity 121 respectively. On the other hand, the hinge arrangement 24 comprises a first connecting joint 241, a second connecting joint 242, a first locker device 243, and a second locker device 244.

The first connecting joint 241 is provided between inner ends of the first and third elongated reinforcing member 211, 213 respectively for allowing the first elongated reinforcing member 211 and the third elongated reinforcing member 213 to pivotally fold and unfold with respect to each other.

Moreover, the second connecting joint 242 is provided between inner ends of the second and fourth elongated reinforcing member 212, 214 respectively for allowing the second elongated reinforcing member 212 and the fourth elongated reinforcing member 214 to pivotally fold and unfold with respect to each other.

On the other hand, the first and a second locker device 243, 244 are coupled to the first connecting joint 241 and the second connecting joint 242 respectively, wherein the first locker device 243 and the second locker device 244 are arranged to operate between a locked position and an unlock position, wherein in the locked position, the first locker device 243 and the second locker device 244 are arranged to lock up pivotal movements of the first connecting joint 241 and the second connecting joint 242, wherein in the unlocked position, the first locker device 243 and the second locker device 244 are arranged to unlock the pivotal movements of the first connecting joint 241 and the second connecting joint 242 so as to allow the first tabletop panel 11 to fold and unfold with respect to the second tabletop panel 12.

According to the preferred embodiment of the present invention, the first tabletop panel 11 and the second tabletop panel 12 are made of plastic material and are preferably formed by injection molding. Other manufacturing method is feasible but injection molding is the preferred mode of manufacturing method of the present invention. Moreover, each of the first tabletop panel 11 and the second tabletop panel 12 is rectangular in cross-sectional shape so that when they are foldably connected by the foldable frame 20, the entire foldable table has a rectangular cross sectional shape as well.

The first peripheral edge rim 13 and the second peripheral edge rim 14 are integrally extended from the first tabletop panel 11 and the second tabletop panel 12 respectively for forming the first receiving cavity 111 and the second receiving cavity 121. In this preferred embodiment, each of the first peripheral edge rim 13 and the second peripheral edge rim 14 is extended from a corresponding outer transverse edge and two longitudinal edges of the first tabletop panel 11 and the second tabletop panel 12 respectively. In other words, each of the first peripheral edge rim 13 and the second peripheral edge rim 14 form a U-shaped cross section with viewed from the bottom side of the foldable table.

Thus, the first peripheral rim 13 has a first transversely extending portion 131 and two first longitudinally extending portion 132, while second peripheral rim 14 has a second transversely extending portion 141 and two second longitudinally extending portion 142.

The first and the second elongated reinforcing member 211, 212 are extended along first longitudinally extending portions 132 of the first peripheral rim 13 respectively, while the third and the fourth elongated reinforcing member 213, 214 are extended along the longitudinally extending portions 142 of the second peripheral edge rim 14.

The reinforcing frame 21 further comprises a first transverse member 215 transversely extended between the first and second reinforcing members 211, 212 at outer end portions thereof, and a second transverse member 216 transversely extended between the third and fourth reinforcing members 213, 214 at outer end portions thereof. As shown in FIG. 2, two ends of the first transverse member 215 are affixed to the first and second reinforcing members 211, 212, preferably be welding, to enhance the rigid support of the reinforcing frame 21 at the first tabletop panel 11 at the transverse side thereof. Likewise, two ends of the second transverse member 216 are affixed to the third and fourth reinforcing members 213, 214, preferably be welding, to enhance the rigid support of the reinforcing frame 21 at the second tabletop 12 at the transverse side thereof.

It is worth mentioning that the first transverse member 215 is non-rotatable with respect to the first and second reinforcing members 211, 212, and the second transverse member 216 is non-rotatable with respect to the third and fourth reinforcing members 213, 214. Since the first transverse member 215 is affixed to between first and second reinforcing members 211, 212, each of the first and second reinforcing members 211, 212 does not contain any hole for the end of the first transverse member 215 inserting into thereto. Likewise, since the second transverse member 216 is affixed to between third and fourth reinforcing members 213, 214, each of the third and fourth reinforcing members 213, 214 does not contain any hole for the end of the second transverse member 216 inserting into thereto. Any hole formed at each of the first to fourth reinforcing members 211, 212, 213, 214 will weaken the structure thereof. The foldable table will be wobbly due to the gap between the hole and the end of each of the first to fourth reinforcing members 211, 212, 213, 214.

On the other hand, the first leg frame 22 comprises a first supporting leg 221 having two first leg members 2211 pivotally connected to the first and the second elongated reinforcing member 211, 212, and a first connecting frame 222 foldably connected between the first tabletop panel 11 and the first supporting leg 221 in such a manner that the first supporting leg 221 is capable of selectively and pivotally folding toward and unfolding from the first tabletop panel 11 through the first connecting frame 222.

Similarly, the second leg frame 23 comprises a second supporting leg 231 having two second leg members 2311 pivotally connected to the third and the fourth elongated reinforcing member 213, 214, and a second connecting frame 232 foldably connected between the second tabletop panel 12 and the second supporting leg 231 in such a manner that the second supporting leg 231 is capable of selectively and pivotally folding toward and unfolding from the second tabletop panel 12 through the second connecting frame 232.

More specifically, the first connecting frame 222 comprises a first folding rod 2221 transversely extended between two inner end portions of the first reinforcing member 211 and the second reinforcing member 212 in the first receiving cavity 111, a first pivotal connecting shaft 2222 having one end pivotally extended from a mid portion of the first folding rod 2221, and a plurality of first elongated folding rods 2223 each having one end pivotally connected to the first leg members 2211 respectively, and another end pivotally coupled with another end of the first pivotal connecting shaft 2222. As shown in FIG. 1 of the drawings, when the elongated folding rods 2223 are pivotally folded with respect to the first pivotal connecting shaft 2222, the first supporting leg 221 is capable of folding and unfolding toward the first tabletop panel 11.

The second connecting frame 232 comprises a second folding rod 2321 transversely extended between two inner end portions of the third reinforcing member 213 and the fourth reinforcing member 214 in the second receiving cavity 121, a second pivotal connecting shaft 2322 having one end pivotally extended from a mid portion of the second folding rod 2321, and a plurality of second elongated folding rods 2323 each having one end pivotally connected to the second leg members 2311 respectively, and another end pivotally coupled with another end of the second pivotal connecting shaft 2322. Also as shown in FIG. 1 of the drawings, when the elongated folding rods 2323 are pivotally folded with respect to the second pivotal connecting shaft 2322, the second supporting leg 231 is capable of folding and unfolding toward the second tabletop panel 12.

As shown in FIGS. 1 and 2, the first supporting leg 221 further comprises a tubular first folding member 2215 coaxially coupled with the first transverse member 215 in a rotatably movable manner, wherein the first leg members 2211 are coupled at the first folding member 2215 to pivotally move between the first and second reinforcing members 211, 212 via the first transverse member 215. Accordingly, the first transverse member 215 is coaxially received in the first folding member 2215 to enable the rotational movement of the first folding member 2215 about the first transverse member 215. Therefore, when the first leg frame 22 is pivotally folded, the first transverse member 215 is stationary to rigidly support the transverse side of the first tabletop panel 11.

A length of the first folding member 2215 is shorter than a length of the first transverse member 215. In particular, the length of the first folding member 2215 is slightly longer than a distance between two upper ends of the first leg members 2211. Therefore, the pivot movement point of the first leg frame 21 is shifted closer to the longitudinal centerline of the first tabletop panel 11. Unlike the conventional leg structure, the folding leg is coupled at two longitudinal sides of the tabletop, such that the pivot movement point of the conventional folding leg is located at the two longitudinal sides of the tabletop.

Since the length of the first folding member 2215 is shorter than the length of the first transverse member 215, the first leg frame 22 may slide along the first transverse member 215. The reinforcing frame 21 further comprises two first retainers 217 affixed to the first transverse member 215 at two ends of the first folding member 2215 respectively to block the sliding movement of the first folding member 2215 with respect to the first transverse member 215. Accordingly, each of the first retainers 217 has a U-shaped cross section affixed to the first transverse member 215. The two ends of the first folding member 2215 are frictionally engaged with the first retainers 217 respectively. In particular, inner surfaces of the first retainers 217 are frictionally biased against outer circumferential surfaces of the first folding member 2215 at the two ends thereof when the first retainers 217 are affixed to the first transverse member 215. Therefore, the first folding member 2215 is pressed to the first transverse member 215 by the first retainers 217 to minimize the gap therebetween while the first folding member 2215 is still able to be rotated about the first transverse member 215 when the rotational force at the first folding member 2215 is larger than the frictional force at the first retainers 217. When the gap between the first folding member 2215 and the first transverse member 215 is minimized, the first leg frame 22 will press toward the first transverse member 215 to enhance the rigidity of the first tabletop panel 11 which is supported by the first leg frame 22, so as to prevent any unwanted wobbling movement thereof. Therefore, the first retainers 217 not only provides a blocking function to prevent the unwanted sliding movement of the first leg frame 22 but also minimize the gap between the first leg frame 22 and the first transverse member 215 to prevent the unwanted wobbling movement of the first tabletop panel 11.

It is worth mentioning that the first retainers 217 are also coupled at the bottom side of the first tabletop panel 11 through the first transverse member 215, through the screws of the first retainers 217, so as to lock up the first transverse member 215 at the bottom side of the first tabletop panel 11. As a result, the clearance between the first transverse member 215 and the bottom side of the first tabletop panel 11 will be minimized to enhance the support of the first tabletop panel 11 and to prevent the unwanted wobbling movement of the first tabletop panel 11.

As shown in FIGS. 1 and 2, the second supporting leg 231 further comprises a tubular second folding member 2315 coaxially coupled with the second transverse member 216 in a rotatably movable manner, wherein the second leg members 2311 are coupled at the second folding member 2315 to pivotally move between the third and fourth reinforcing members 213, 214 via the second transverse member 216. Accordingly, the second transverse member 216 is coaxially received in the second folding member 2315 to enable the rotational movement of the second folding member 2315 about the second transverse member 216. Therefore, when the second leg frame 23 is pivotally folded, the second transverse member 216 is stationary to rigidly support the transverse side of the second tabletop panel 12.

A length of the second folding member 2315 is shorter than a length of the second transverse member 216. In particular, the length of the second folding member 2315 is slightly longer than a distance between two upper ends of the second leg members 2311. Therefore, the pivot movement point of the second leg frame 23 is shifted closer to the longitudinal centerline of the second tabletop panel 12. Unlike the conventional leg structure, the folding leg is coupled at two longitudinal sides of the tabletop, such that the pivot movement point of the conventional folding leg is located at the two longitudinal sides of the tabletop.

Since the length of the second folding member 2315 is shorter than the length of the second transverse member 216, the second leg frame 23 may slide along second first transverse member 216. The reinforcing frame 21 further comprises two second retainers 218 affixed to the second transverse member 216 at two ends of the second folding member 2315 respectively to block the sliding movement of the second folding member 2315 with respect to the second transverse member 216. Accordingly, each of the second retainers 218 has a U-shaped cross section affixed to the second transverse member 216. The two ends of the second folding member 2315 are frictionally engaged with the second retainers 218 respectively. In particular, inner surfaces of the second retainers 218 are frictionally biased against outer circumferential surfaces of the second folding member 2315 at the two ends thereof when the second retainers 218 are affixed to the second transverse member 216. Therefore, the second folding member 2315 is pressed to the second transverse member 216 by the second retainers 218 to minimize the gap therebetween while the second folding member 2315 is still able to be rotated about the second transverse member 216 when the rotational force at the first folding member 2215 is larger than the frictional force at the second retainers 218. When the gap between the second folding member 2315 and the second transverse member 216 is minimized, the second leg frame 23 will press toward the second transverse member 216 to enhance the rigidity of the second tabletop panel 12 which is supported by the second leg frame 23, so as to prevent any unwanted wobbling movement thereof. Therefore, the second retainers 218 not only provides a blocking function to prevent the unwanted sliding movement of the second leg frame 23 but also minimize the gap between the second leg frame 23 and the second transverse member 216 to prevent the unwanted wobbling movement of the second tabletop panel 12.

It is worth mentioning that the second retainers 218 are also coupled at the bottom side of the second tabletop panel 12 through the second transverse member 216, through the screws of the second retainers 218, so as to lock up the second transverse member 216 at the bottom side of the second tabletop panel 12. As a result, the clearance between the second transverse member 216 and the bottom side of the second tabletop panel 12 will be minimized to enhance the support of the second tabletop panel 12 and to prevent the unwanted wobbling movement of the second tabletop panel 12.

In other words, the first connecting frame 222 and the second connecting frame 232 are capable of facilitating folding and unfolding of the first leg frame 22 and the second leg frame 23. When the first leg frame 22 and the second leg frame 23 are folded toward the first and the second tabletop panel 11, 12, the entire foldable table can be reduced to a compact size.

Figure 4:
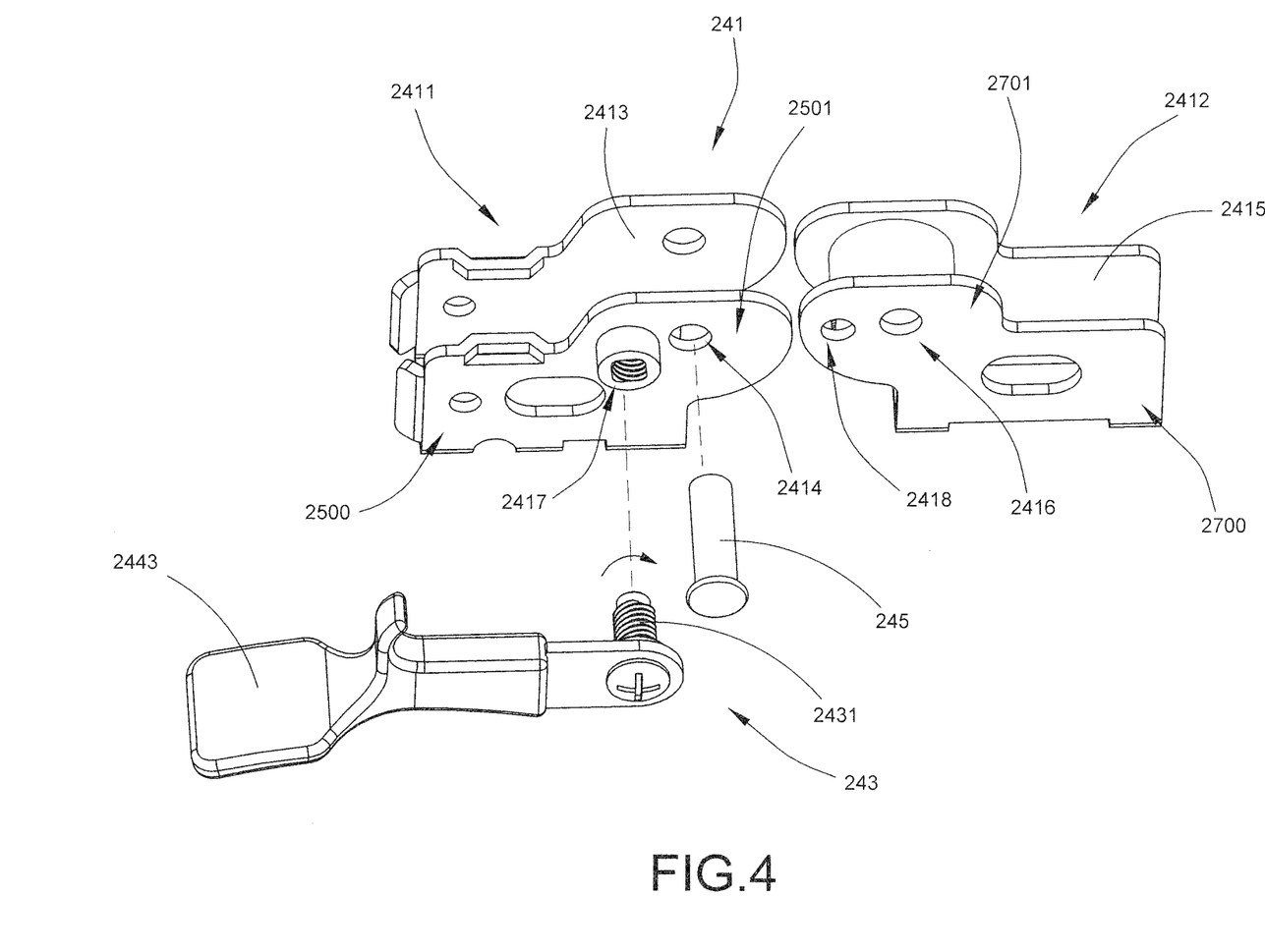
FIG. 4 is a perspective view of a connecting joint of the foldable table according to the above preferred embodiment of the present invention.
Figure 5:
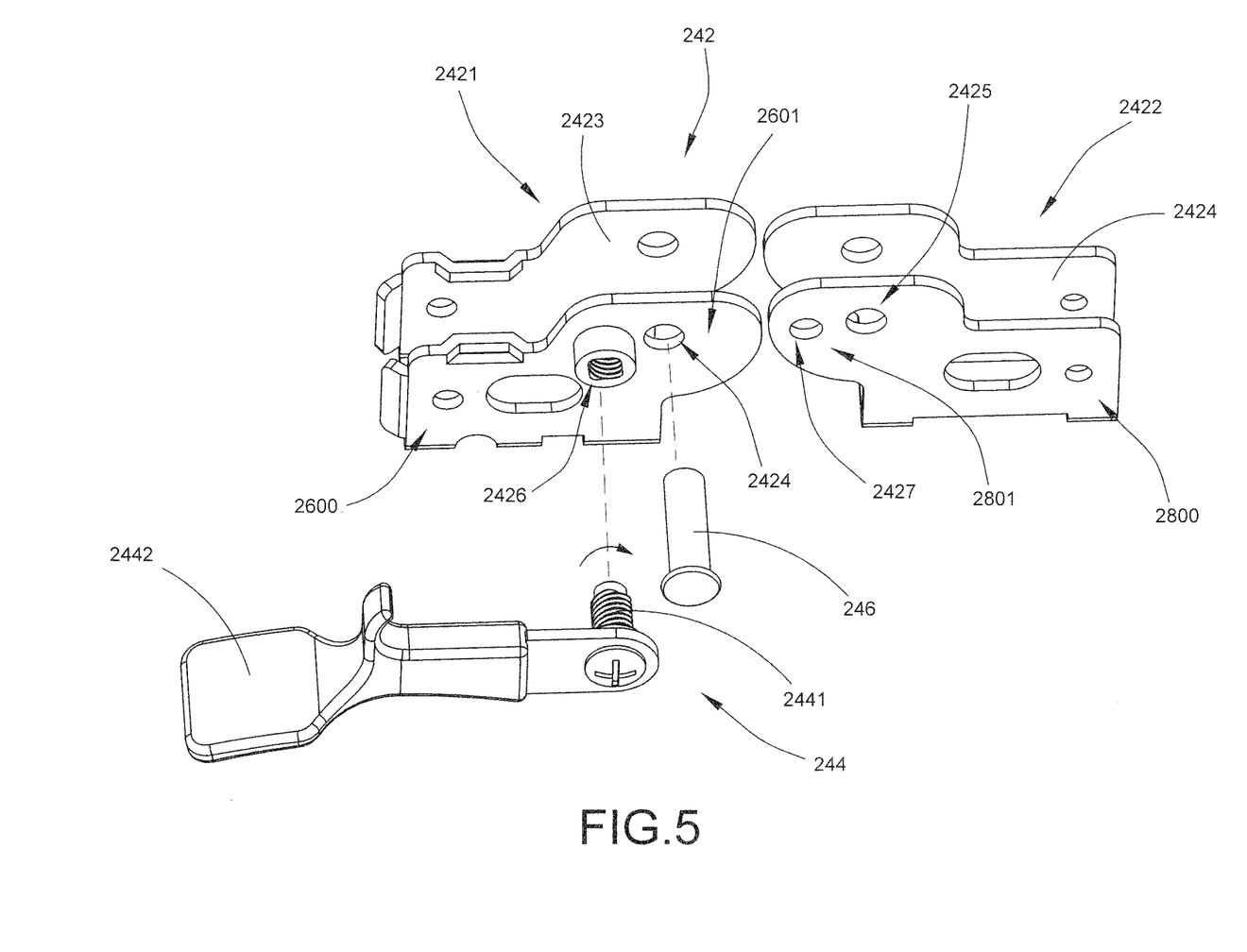
FIG. 5 is an exploded perspective view of the connecting joint of the foldable table according to the above preferred embodiment of the present invention.

Referring to FIG. 4 to FIG. 5 of the drawings, the hinge arrangement 24 comprises the first connecting joint 241, the second connecting joint 242, the first locker device 243, and the second locker device 244. According to the preferred embodiment of the present invention, the first connecting joint 241 comprises a first joint member 2411 and a third joint member 2412 coupled to the inner end of the first elongated reinforcing member 211 and the third elongated reinforcing member 213 respectively. The first joint member 2411 comprises a plurality of first connecting panels 2413 spacedly mounted to the first elongated reinforcing member 211, wherein each of the first connecting panels 2413 has a first pivot hole 2414 alignedly formed thereon. Moreover, the hinge arrangement 24 further comprises a first pivot pin 245 arranged to penetrate the first pivot holes 2414 formed on the first connecting panels 2413.

On the other hand, the third joint member 2412 is coupled to the inner end of the third elongated reinforcing member 213. The third joint member 2412 comprises a plurality of third connecting panels 2415 spacedly mounted to the third elongated reinforcing member 213, wherein each of the third connecting panels 2415 has a third pivot hole 2416 alignedly formed thereon. As shown in FIG. 4 of the drawings, the first connecting panels 2413 are arranged to overlap with the third connecting panels 2415 at the space formed between the first connecting panels 2413 and the third connecting panels 2415, wherein the first pivot pin 245 is arranged to penetrate the first pivot holes 2414 and the third pivot holes 2416 so that the first joint member 2411 and the third joint member 2413 can be pivotally folded and unfolded with respect to each other.

Similarly, as shown in FIG. 5 of the drawings, the second connecting joint 242 comprises a second joint member 2421 and a fourth joint member 2422 coupled to the inner end of the second elongated reinforcing member 212 and the fourth elongated reinforcing member 214 respectively. The second joint member 2421 comprises a plurality of second connecting panels 2423 spacedly mounted to the second elongated reinforcing member 212, wherein each of the second connecting panels 2423 has a second pivot hole 2424 alignedly formed thereon. Moreover, the hinge arrangement 24 further comprises a second pivot pin 246 arranged to penetrate the second pivot holes 2424 formed on the second connecting panels 2423.

On the other hand, the fourth joint member 2422 is coupled to the inner end of the fourth elongated reinforcing member 214. The fourth joint member 2422 comprises a plurality of fourth connecting panels 2424 spacedly mounted to the fourth elongated reinforcing member 214, wherein each of the fourth connecting panels 2422 has a fourth pivot hole 2425 alignedly formed thereon. As shown in FIG. 5 of the drawings, the second connecting panels 2423 are arranged to overlap with the fourth connecting panels 2424 at the space formed between the second connecting panels 2423 and the fourth connecting panels 2422, wherein the second pivot pin 246 is arranged to penetrate the second pivot holes 2424 and the fourth pivot holes 2425 so that the second joint member 2421 and the fourth joint member 2422 can be pivotally folded and unfolded with respect to each other.

It is worth mentioning that the first pivot pin 245 and the second pivot pin 246 are rigid and may be embodied as having a wide variety of cross sectional shapes so as to ensure sound stability of the hinge arrangement 24. Moreover, the first pivot pin 245 and the second pivot pin 246 can be made of a wide variety of materials so as to accommodate different manufacturing and marketing needs.

According to the preferred embodiment, two ends of the first folding rod 2221 are affixed to the first and second joint members 2411, 2421 respectively. In particular, one end of the first folding rod 2221 is affixed to the first connecting panel 2413 at an inner position of the first joint member 2411 while an opposed end of the first folding rod 2221 is affixed to the second connecting panel 2423 at an inner position of the second joint member 2421. Two ends of the second folding rod 2321 are affixed to the third and fourth joint members 2412, 2422 respectively. In particular, one end of the second folding rod 2321 are affixed to the third connecting panel 2415 at an inner position of the third joint member 2422 and an opposed end of second folding rod 2321 is affixed to the fourth connecting panel 2424 at an inner position of the fourth joint member 2422. Accordingly, the first folding rod 2221 is non-rotatable between the first and second joint members 2411, 2421 while the second folding rod 2321 is non-rotatable between third and fourth joint members 2412, 2422.

Therefore, no hole is formed at the inner end portions of the first, second, third and fourth reinforcing members 211, 212, 213, 214 in order to connect to the first and second folding rods 2221, 2321 so as to enhance the rigidity of the reinforcing frame 21.

Each of the first connecting panels 2413 has a first base portion 2500 coupled to the first elongated reinforcing member 211 and a first head portion 2501 upwardly and inwardly extended from the first base portion 2500, wherein the first pivot hole 2414 is formed on the first head portion 2502. Similarly, each of the third connecting panels 2415 has a third base portion 2700 coupled to the third elongated reinforcing member 213 and a third head portion 2701 upwardly and inwardly extended from the third base portion 2500, wherein the third pivot hole 2416 is formed on the third head portion 2701.

Each of the second connecting panels 2423 has a second base portion 2600 coupled to the second elongated reinforcing member 212 and a second head portion 2601 upwardly and inwardly extended from the second base portion 2600, wherein the second pivot hole 2424 is formed on the second head portion 2601. Finally, each of the fourth connecting panels 2424 has a fourth base portion 2800 coupled to the fourth elongated reinforcing member 214 and a fourth head portion 2801 upwardly and inwardly extended from the fourth base portion 2800, wherein the fourth pivot hole 2425 is formed on the fourth head portion 2801.

From the forgoing descriptions, it can be shown that the first tabletop panel 11 and the second tabletop panel 12 can be selectively folded and unfolded through hinge arrangement 24 of the foldable frame 20. Moreover, as mentioned earlier, the first leg frame 22 and the second leg frame 23 can also be folded and unfolded with respect to the first tabletop panel 11 and the second tabletop panel 12 respectively.

Referring to FIG. 4 to FIG. 7 of the drawings, the first locker device 243 comprises a first locker pin 2431 and a first locker handle 2432 extended from the first locker pin 2431, wherein the first locker pin 2431 is arranged to selectively penetrate one of the first connecting panels 2413 and the corresponding third connecting panel 2415 for restricting the relative pivotal movement between the corresponding first joint member 2411 and the third joint member 2412. Accordingly, the first joint member 2411 further has a first locker hole 2417 formed on one of the first connecting panels 2413 while the third joint member 2412 further has a third locker hole 2418 formed on the corresponding third connecting panel 2415, wherein the first locker hole 2417 and the third locker hole 2418 are aligned with each other so that the first locker pin 2431 is arranged to rotatably penetrate the first locker hole 2417 and the third locker hole 2418 for selectively locking the first joint member 2411 and the third joint member 2412. Note that the rotational movement of the first locker pin 2431 is actuated by a movement of the locker handle 2432.

Figure 6:
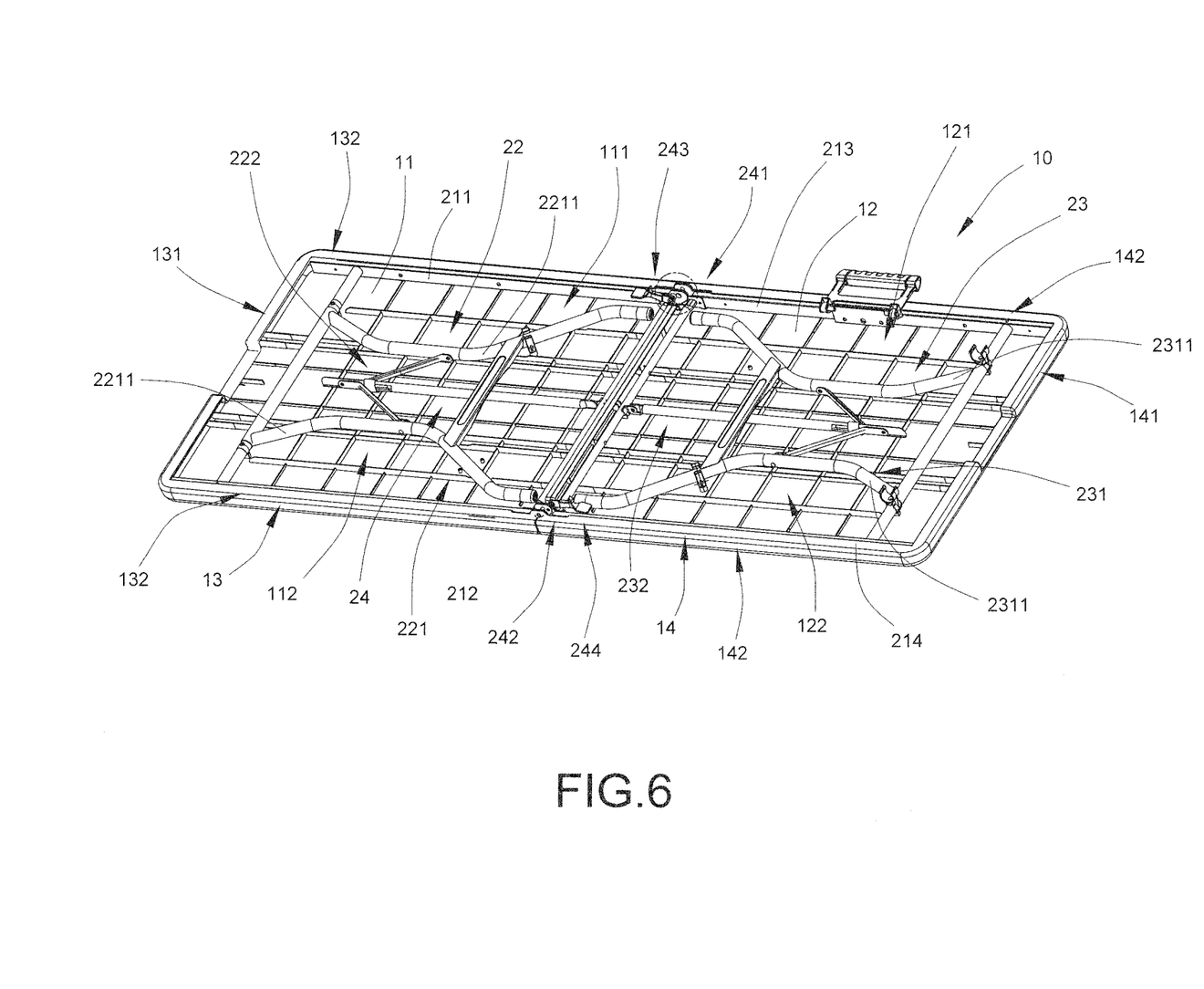
FIG. 6 is a perspective view of the foldable table according to the above preferred embodiment of the present invention, illustrating one of the locker devices.
Figure 7:
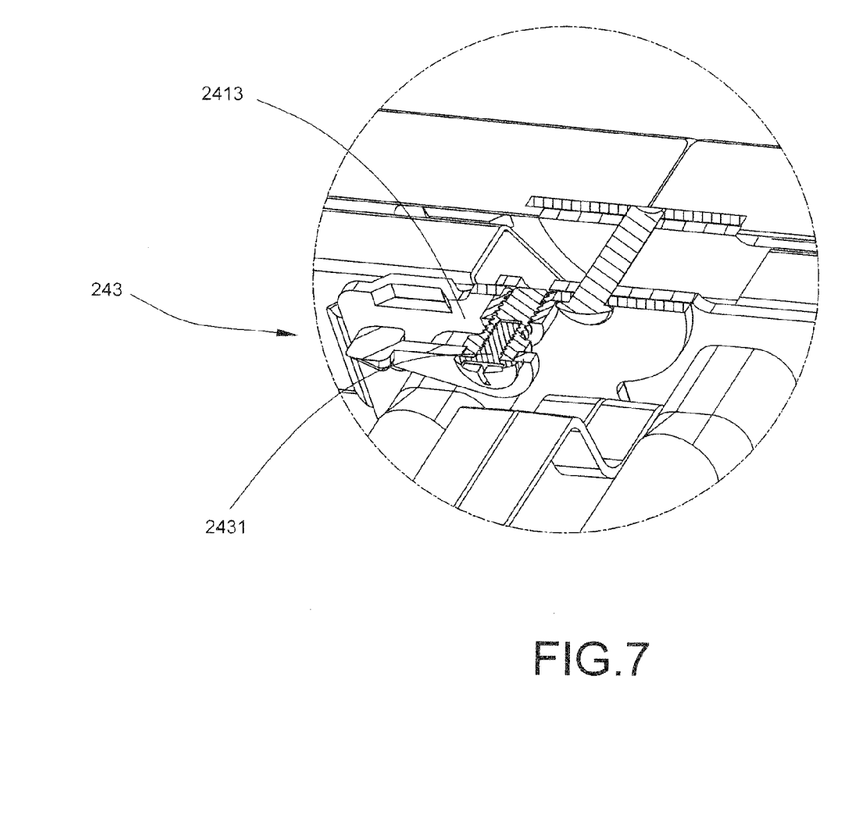
FIG. 7 is a schematic diagram of one of the locker devices according to the above preferred embodiment of the present invention.

On the other hand, the second locker device 244 comprises a second locker pin 2441 and a second locker handle 2442 extended from the second locker pin 2441, wherein the second locker pin 2441 is arranged to selectively penetrate one of the second connecting panels 2423 and the corresponding fourth connecting panel 2424 for restricting the relative pivotal movement between the corresponding second joint member 2421 and the fourth joint member 2422. Accordingly, the second joint member 2421 further has a second locker hole 2426 formed on one of the second connecting panels 2423 while the fourth joint member 2422 further has a fourth locker hole 2427 formed on the corresponding fourth connecting panel 2424, wherein the second locker hole 2426 and the fourth locker hole 2427 are aligned with each other so that the second locker pin 2441 is arranged to rotatably penetrate the second locker hole 2426 and the fourth locker hole 2427 for selectively locking the second joint member 2421 and the fourth joint member 2422. Note that the rotational movement of the second locker pin 2441 is actuated by a movement of the second locker handle 2442.

Referring to FIG. 2 of the drawings, the tabletop 10 further comprises an engagement mechanism 15 provided on an inner side of the first and the second tabletop panel 11, 12 for facilitating easy folding and unfolding of the tabletop 10 while maintaining the stability thereof. More specifically, the engagement mechanism 15 comprises a first engaging member 151 and a second engaging member 152 provided on an inner side edge of the first tabletop panel 11 and the second tabletop panel 12 respectively, wherein the first engaging member 151 is arranged to be detachably engaged with the second engaging member 152.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:
1. A foldable table, comprising:
a tabletop which comprises a first tabletop panel and a second tabletop panel;
a hinge arrangement coupled at said first and second tabletop panels for enabling said first and second tabletop panels being folded to overlap with each other and being unfolded with each other;
first and second leg frames foldably mounted at said first and second tabletop panels respectively; and
a reinforcing frame which comprises:
first through fourth elongated reinforcing members spacedly mounted along longitudinal sides of said first and second tabletop panels respectively;
a first transverse member transversely extended between outer end portions of said first and second reinforcing members at said first tabletop panel, wherein two ends of said first transverse member are affixed to said first and second reinforcing members in a non-rotatably movable manner, wherein said first leg frame is rotatably coupled at said first transverse member; and
a second transverse member transversely extended between outer end portions of said third and fourth reinforcing members at said second tabletop panel, wherein two ends of said second transverse member are affixed to said third and fourth reinforcing members in a non- rotatably movable manner, wherein said second leg frame is rotatably coupled at said second transverse member.

2. The foldable table, as recited in claim 1, wherein said first leg frame comprises a tubular first folding member coaxially coupled with said first transverse member in a rotatably movable manner and a first supporting leg extended from said first folding member, such that said first supporting leg is capable of selectively and pivotally folding toward and unfolding from said first tabletop panel.

3. The foldable table, as recited in claim 2, wherein said first transverse member is coaxially received at said first folding member.

4. The foldable table, as recited in claim 3, wherein a length of said first folding member is shorter than a length of said first transverse member.

5. The foldable table, as recited in claim 4, wherein said reinforcing frame further comprises two first retainers affixed to said first transverse member at two ends of said first folding member respectively to block a sliding movement of said first folding member with respect to said first transverse member.

6. The foldable table, as recited in claim 5, wherein said two ends of said first folding member are frictionally engaged with said first retainers respectively so as to enable said first folding member to be rotated about said first transverse member.

7. The foldable table, as recited in claim 6, wherein each of said first retainers, having a U-shaped cross section, is affixed to said first transverse member and is pressed against an outer circumferential surface of said first folding member at said corresponding end thereof to minimize a gap between said first transverse member and said first folding member.

8. The foldable table, as recited in claim 7, wherein said first retainers not only affixes at said first transverse member but also couples to a bottom side of said first tabletop panel to minimize a clearance between said first transverse member and said first tabletop panel.

9. The foldable table, as recited in claim 8, wherein said hinge arrangement comprises first, second, third, and fourth joint members coupled to inner end of said first second, third, and fourth reinforcing members respectively, wherein said first and third joint members are pivotally coupled with each other while said second and fourth joint members are pivotally coupled with each other, wherein said reinforcing frame further comprises a first folding rod affixed between said first and second joint members, and a second folding rod affixed between said third and fourth joint members.

10. The foldable table, as recited in claim 9, further comprising a first pivotal connecting shaft having one end pivotally extended from a mid portion of said first folding rod, and a first elongated folding rod having one end pivotally connected to said first leg frame and another end pivotally coupled with another end of said first pivotal connecting shaft, in such a manner that when said elongated folding rod is pivotally folded with respect to said first pivotal connecting shaft, said first leg frame is capable of folding and unfolding toward said first tabletop panel.

11. The foldable table, as recited in claim 5, wherein each of said first retainers, having a U-shaped cross section, is affixed to said first transverse member and is pressed against an outer circumferential surface of said first folding member at said corresponding end thereof to minimize a gap between said first transverse member and said first folding member.

12. The foldable table, as recited in claim 5, wherein said first retainers not only affixes at said first transverse member but also couples to a bottom side of said first tabletop panel to minimize a clearance between said first transverse member and said first tabletop panel.

13. The foldable table, as recited in claim 4, wherein said hinge arrangement comprises first, second, third, and fourth joint members coupled to inner end of said first second, third, and fourth reinforcing members respectively, wherein said first and third joint members are pivotally coupled with each other while said second and fourth joint members are pivotally coupled with each other, wherein said reinforcing frame further comprises a first folding rod affixed between said first and second joint members, and a second folding rod affixed between said third and fourth joint members.

14. The foldable table, as recited in claim 3, wherein said reinforcing frame further comprises two first retainers affixed to said first transverse member at two ends of said first folding member respectively to block a sliding movement of said first folding member with respect to said first transverse member.

15. The foldable table, as recited in claim 14, wherein said two ends of said first folding member are frictionally engaged with said first retainers respectively so as to enable said first folding member to be rotated about said first transverse member.

16. The foldable table, as recited in claim 2, wherein said reinforcing frame further comprises two first retainers affixed to said first transverse member at two ends of said first folding member respectively to block a sliding movement of said first folding member with respect to said first transverse member.

17. The foldable table, as recited in claim 16, wherein said two ends of said first folding member are frictionally engaged with said first retainers respectively so as to enable said first folding member to be rotated about said first transverse member.

18. The foldable table, as recited in claim 2, wherein a length of said first folding member is shorter than a length of said first transverse member.

19. The foldable table, as recited in claim 1, wherein said hinge arrangement comprises first, second, third, and fourth joint members coupled to inner end of said first second, third, and fourth reinforcing members respectively, wherein said first and third joint members are pivotally coupled with each other while said second and fourth joint members are pivotally coupled with each other, wherein said reinforcing frame further comprises a first folding rod affixed between said first and second joint members, and a second folding rod affixed between said third and fourth joint members.

20. The foldable table, as recited in claim 19, further comprising a first pivotal connecting shaft having one end pivotally extended from a mid portion of said first folding rod, and a first elongated folding rod having one end pivotally connected to said first leg frame and another end pivotally coupled with another end of said first pivotal connecting shaft, in such a manner that when said elongated folding rod is pivotally folded with respect to said first pivotal connecting shaft, said first leg frame is capable of folding and unfolding toward said first tabletop panel.

* * * * *